(12) United States Patent
Goodridge

(10) Patent No.: US 6,346,962 B1
(45) Date of Patent: Feb. 12, 2002

(54) CONTROL OF VIDEO CONFERENCING SYSTEM WITH POINTING DEVICE

(75) Inventor: Steven Goodridge, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/032,132

(22) Filed: Feb. 27, 1998

(51) Int. Cl.[7] .................................................. H04N 7/14
(52) U.S. Cl. ............................. 348/14.05; 348/14.03; 348/14.07
(58) Field of Search .......................... 348/14–20, 211, 348/212–214; 379/93.21, 102.01, 102.02, 202; 709/204; 345/326–330; 396/55, 406

(56) References Cited

U.S. PATENT DOCUMENTS

| 5,473,680 A | 12/1995 | Porter ........................ 379/201 |
| 5,506,954 A | 4/1996 | Arshi et al. ................. 395/162 |
| 5,515,099 A | 5/1996 | Cortjens et al. ............. 348/15 |
| 5,594,859 A | 1/1997 | Palmer et al. .............. 395/330 |
| 5,598,209 A | 1/1997 | Cortjens et al. ............. 348/211 |
| 5,617,539 A | 4/1997 | Ludwig et al. ........ 395/200.02 |
| 5,650,831 A | 7/1997 | Farwell ...................... 348/734 |
| 5,657,096 A | 8/1997 | Lukacs ....................... 348/585 |
| 5,657,246 A | * 8/1997 | Hogan et al. ................. 348/14 |
| 5,678,068 A | * 10/1997 | Hirano et al. ................. 396/55 |
| 5,704,042 A | 12/1997 | Hester et al. .......... 395/200.34 |
| 5,872,594 A | * 2/1999 | Thompson .................. 348/213 |
| 6,084,583 A | * 7/2000 | Gerszberg et al. .......... 345/327 |

FOREIGN PATENT DOCUMENTS

| JP | 02197831 A | * 8/1990 | ................ 396/406 |
| JP | 4361493 | 12/1992 | ............ H04N/5/94 |
| JP | 5333836 | 12/1993 | |
| JP | 5333839 | 12/1993 | ............ G09G/5/08 |
| JP | 5333840 | 12/1993 | ............ G09G/5/08 |
| JP | 5336463 | 12/1993 | ............ H04N/5/45 |
| JP | WO9407327 | 3/1994 | .......... H04N/5/232 |
| JP | 07095549 | 6/1994 | ............ H04N/7/14 |
| JP | 1091385 | 6/1995 | ............ H04N/7/15 |
| JP | 10200807 | 1/1997 | .......... H04N/5/232 |
| JP | 9506217 | 6/1997 | ............ H04N/7/15 |
| JP | 99231 | 9/1997 | ............ H04N/7/15 |

* cited by examiner

Primary Examiner—Curtis Kuntz
Assistant Examiner—George Eng
(74) Attorney, Agent, or Firm—Myers, Bigel, Sibley & Sajovec, P.A.

(57) ABSTRACT

Methods, systems or apparatus and computer program products are provided that control the operation of a camera in a video conferencing system. In particular, the setup and display of video information in a video conferencing system may be controlled by displaying a graphic user interface associated with the setup of the video conferencing system which includes an icon corresponding to input from a pointing device so as to provide computer generated visual feedback as to a screen location corresponding to a location of the pointing device and displaying video information so as to replace substantially all of the displayed graphic user interface including the icon. When displaying video information, control of the video information displayed is based upon user input from a pointing device without displaying an icon corresponding to the pointing device. Furthermore, the camera movement may be controlled in real time based on pointing device input such as movement.

21 Claims, 9 Drawing Sheets

CONTROL OF VIDEO CONFERENCING SYSTEM WITH POINTING DEVICE

FIELD OF THE INVENTION

The present invention relates generally to video conferencing systems and more particularly to the control of the display of a video conferencing system.

BACKGROUND OF THE INVENTION

With increases in network bandwidth, video conferencing has become more accessible and less costly. For example, many current video conferencing systems allow for video conferencing over an ISDN connection. These video conferencing systems typically utilize a personal computer at each side of an Integrated Switched Digital Network (ISDN) connection to capture and transmit and receive and reproduce audio and video information.

Because these systems are often based on personal computers, these systems typically utilize a graphic user interface to provide control panels and other interfaces for operation. These graphic user interfaces often use a pointing device with an on-screen icon representing the position of the pointing device to control their operation.

Possibly because of the close connection between personal computers and video conferencing systems, many video conferencing systems utilize elements of graphic user interfaces when displaying video information. In some cases, the video information is incorporated into a graphic user interface in the form of a window which only covers a portion of the displayable area of a screen. In other cases, elements of the graphic user interface are incorporated into a predominantly video display.

While graphic user interfaces have made use of personal computers more intuitive, they may still be intimidating and confusing to some users. The combination of graphic user interface elements with video information may also clutter the screen and distract the user from the typically more important video information being presented. Furthermore, the combination of video information with computer generated information may complicate the display process as well as decrease the efficiency with which video information may be displayed and increase the complexity of video conferencing system development.

U.S. Pat. Nos. 5,515,099 and 5,598,209 are examples of conventional hybrid systems which utilize both computer generated and video information in a display. In these patents motion of a camera is controlled by moving an icon over a video image and then selecting the direction to point the camera. However, this two-step process may not be intuitive and may undesirably incorporatecomputer generated information into a video image and may result in clutter of the screen associated with such a hybrid display.

Accordingly, a need exists for improvement in the control of video conferencing systems that can reduce clutter and confusion among users and can simplify the development of video conferencing systems.

SUMMARY OF THE INVENTION

In view of the above discussion, it is an object of the present invention to provide for control of a video conferencing system which is intuitive to a user.

A further object of the present invention is to provide for control of a video conferencing system which does not require computer generated information to be displayed simultaneously with video information.

Still another object of the present invention is to provide for control of a video conferencing system which does not require information to be displayed unrelated to the video images of the conference which clutter the display.

These and other objects of the present invention are provided by methods, systems or apparatus and computer program products that control the setup and display of video information in a video conferencing system by displaying a graphic user interface associated with the setup of the video selections. Thus, the user interface for the video conferencing system may be simplified. Furthermore, by utilizing movement or selection of the pointing device without displaying a pointing device icon, the present invention provides for control of video information in a video conferencing system without the need to combine computer generated information with the video information. Also, because the video information display does not include elements of the graphic user interface, the video display reduces the screen clutter, reduces distractions and maximizes the area of the screen for displaying the information of highest importance. Finally, the present invention provides for a more intuitive control of camera movement by coupling the movement of the camera directly to the pointing device movement or to simple selections with the pointing device buttons or other selection devices.

In a particular embodiment of the present invention, the operation of a video conferencing system is controlled by controlling in real time the operation of a camera which provides video to be displayed through input to a pointing device so as to provide direct control of the motion of the camera through movement of the pointing device. In further embodiments, the operation of a graphic user interface is also controlled by the pointing device by displaying an icon corresponding to the position of the pointing device with respect to the graphic user interface so as to provide computer generated visual feedback as to the screen location corresponding to the location of the conferencing system which includes an icon corresponding to input from a pointing device so as to provide computer generated visual feedback as to a screen location corresponding to a location of the pointing device and displaying video information so as to replace substantially all of the displayed graphic user interface including the icon. When displaying video information, control of the video information displayed is based upon user input from a pointing device without displaying an icon corresponding to the pointing device.

The control of the display of video information may include receiving user input from the pointing device without displaying computer generated visual feedback of the user input and repositioning a remote camera associated with the video conferencing system based upon the user input from the pointing device. Similarly, the control of the video information may include controlling the source of the video information displayed based upon input from the pointing device including selecting for display a source of video information from a plurality of video information sources based upon input from the pointing device. Furthermore, the arrangement of the display of video information from multiple video information sources may also be controlled by the pointing device.

In particular embodiments of the present invention, the repositioning of the camera may be achieved by receiving input from the pointing device corresponding to movement of the pointing device to provide movement data. A timer is initiated upon receipt of the movement data and a camera associated with the video conferencing system actuated in a direction indicated by the movement data. Motion of the camera is stopped if the timer expires without receiving subsequent movement data.

In another embodiment of the present invention, the field of view of the camera may be zoomed in or out in response to user input from the pointing device. In particular, the zooming may be accomplished by receiving input from the pointing device corresponding to activation of a first selection device of the pointing device and actuating a camera associated with the video conferencing system so as to zoom the camera in a first direction in response to the activation of the first selection device. Input is also received from the pointing device corresponding to de-activation of the first selection device of the pointing device and the zoom of the camera is stopped in response to the received input corresponding to the de-activation of the first selection device.

In another embodiment of the present invention if input from the pointing device corresponding to activation of a predefined selection device of the pointing device then the video information is replaced with the graphic user interface and the icon in response to the input.

Thus, the invention recognizes that movement of the camera provides feedback to the user so that a separate icon is not necessary to confirm user pointing device during setup of the video conferencing system.

In still another embodiment of the present invention, the camera is controlled by receiving input from the pointing device corresponding to movement of the pointing device and actuating the camera associated with the video conferencing system in a direction indicated by the movement of the pointing device. Furthermore, a timer may be initiated upon receipt of the movement data and the motion of the camera stopped if the timer expires without receiving subsequent movement data. Similarly, zooming of the camera may be controlled directly through pointing device input. Likewise, the source and arrangement of video information in a display may be controlled directly from pointing device input.

As will be appreciated by those of skill in the art, the present invention may be embodied as methods, apparatus or computer program products.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices.

As will be appreciated by one of skill in the art, the present invention may be embodied as a method, video conferencing system, or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Figure 1:
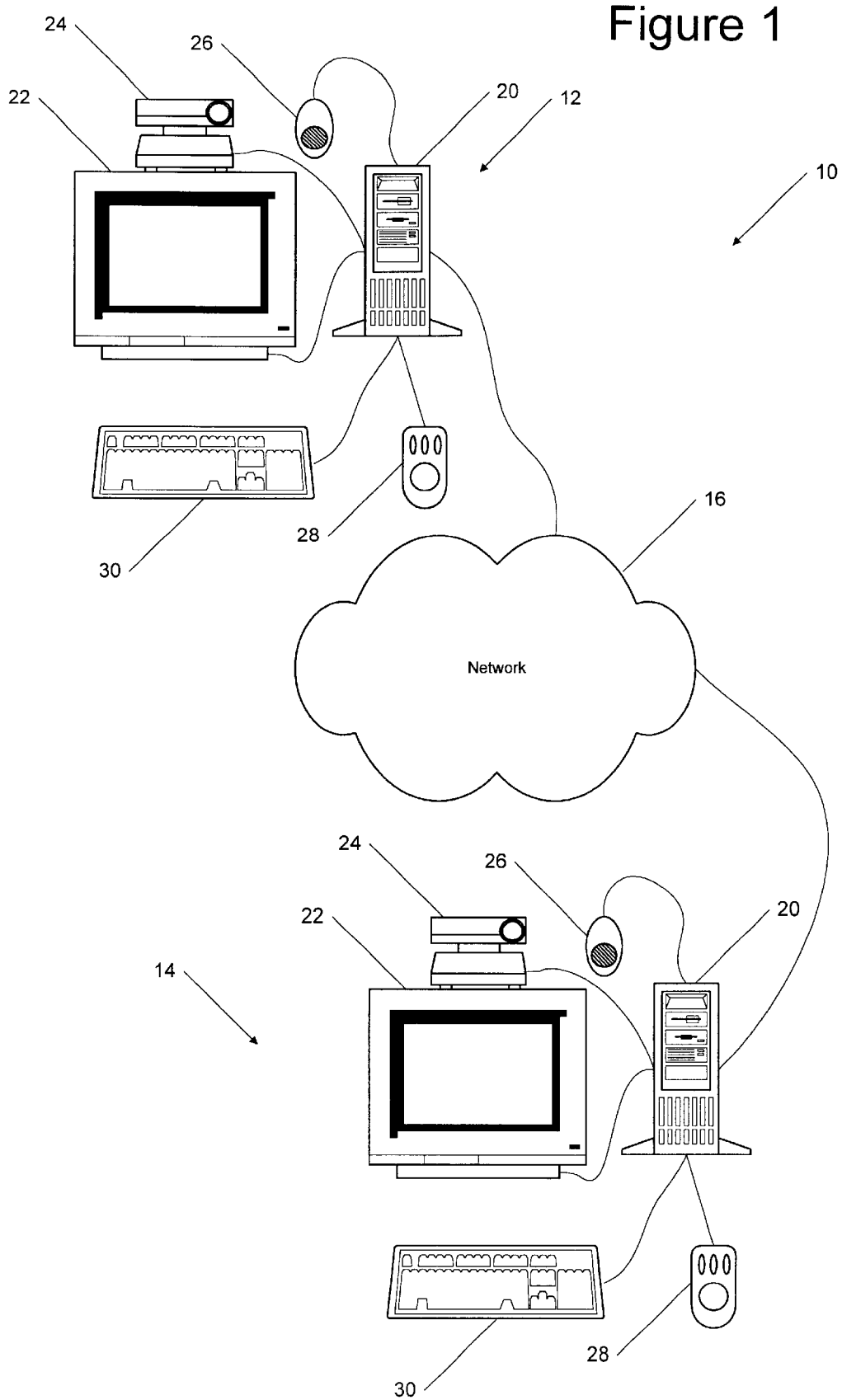
FIG. 1 is a schematic diagram illustrating a video conferencing system according to the present invention.

FIG. 1 illustrates one embodiment of the present invention. As seen in FIG. 1, a video conferencing system 10 includes a first video conference station 12 and a second video conference station 14. The video conference stations 12 and 14 communicate over a communication network 16. The communication network 16 may be local area network, a wide area network, the Internet, a public telephone system or the like. The video conference stations 12 and 14 share video, audio and other information over network 16.

The video conference stations 12 and 14 may be essentially the same and may include a processing system 22 such as a personal computer or workstation. The processing system may control one or more displays 22 and a video camera 24 for capturing video information to be sent to the other video conference station for display. While the video conference stations illustrated in FIG. 1 illustrate a single display 20, as will be appreciated by those of skill in the art, multiple displays may be utilized. Furthermore, the displays may be computer graphics displays utilizing video standards such as the VGA or SVGA standards or may be video monitors utilizing, for example, the NTSC of PAL video standards.

The video conference stations 12 and 14 may also obtain input from a microphone 26 to obtain audio information. The data processing system may also receive user input from one or more input devices such as a pointing device 28 or keyboard 30. The pointing device may be a mouse, a trackball or the like. However, the pointing device preferably includes both movement devices (e.g. trackball) as well as selection devices such as buttons. In a preferred embodiment of the present invention, the pointing device includes three buttons for selection purposes.

In operation, the video conference stations 12 and 14 obtain audio information from microphone 26 and video information from camera 24 and transmit the audio and video information between the processing systems 20 over network 16. The processing systems 20 receive the audio and video information and present the audio information to the user through a loudspeaker and the video information through a display device 20 such as a CRT or other display.

According to the present invention, camera 24 may also be controlled by processing system 20 either locally or remotely from other video conference stations. The present invention provides for control of camera movement and display selection utilizing the pointing device 28.

Figure 2A:
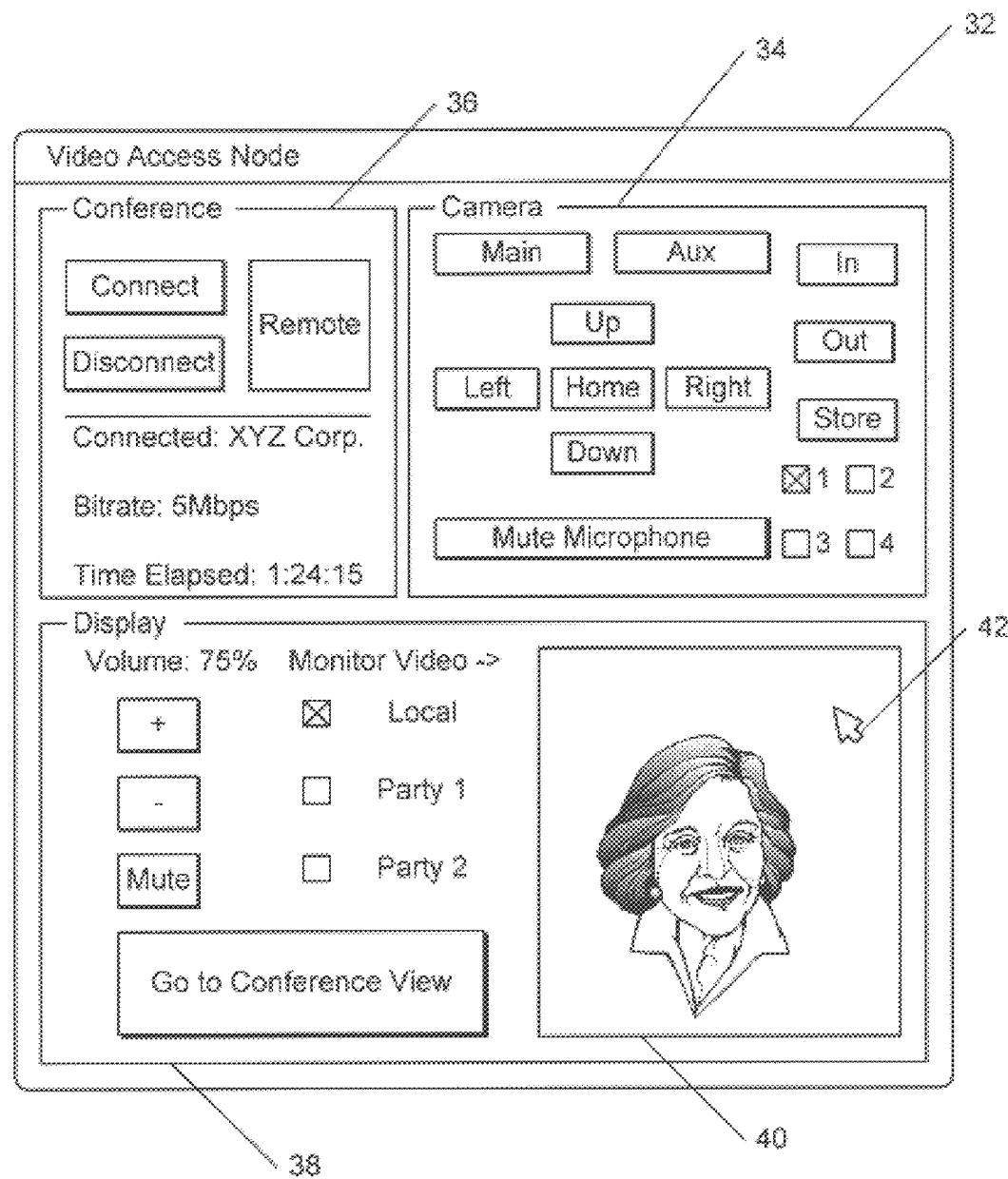
FIGS. 2A through 2D are illustrations of displays utilizing the present invention.

FIGS. 2A through 2D illustrate displays which may be provided to a user on display 22 utilizing a video conferencing system according to the present invention. FIG. 2A illustrates a setup screen which includes computer generated information for establishing or controlling a video conference session. As seen in FIG. 2A, display screen 32 includes computer generated information such as a camera control panel 34, a conference control panel 36 and a display control panel 38. The display 32 may also include video information 40. Control of the setup screen is provided by the pointing device 28 which has a corresponding computer generated icon 42 which corresponds to a position of the pointing device 28 on the screen 32. Selections are made by using the movement device of the pointing device 28 and then depressing or "clicking" one of the selection devices or buttons of the pointing device 28.

Mechanisms for obtaining pointing device input and operating on that input in operating systems such as International Business Machine's OS/2® or Microsoft's Windows® or Windows95® are well understood by those of skill in the art. Furthermore, modification of the functions carried out as a result of pointing device input are within the capabilities of one of skill in the art and, therefore, will not be discussed in detail herein. Accordingly, it will be understood that, by describing the functions carried out upon input from the pointing device, those functions could be readily implemented by one of skill in the art.

As seen in FIG. 2A, the screen 32 includes both video and computer generated information. However, according to the present invention, a user may select a "conference view" which eliminates all or substantially all of the computer generated information and displays primarily or exclusively video information on display screen 32. Such a mode of the video conferencing system may be entered by, for example, moving the icon corresponding to the location of the pointing device over the "Go to Conference View" button and depressing a selection button of the pointing device.

Figure 2B:
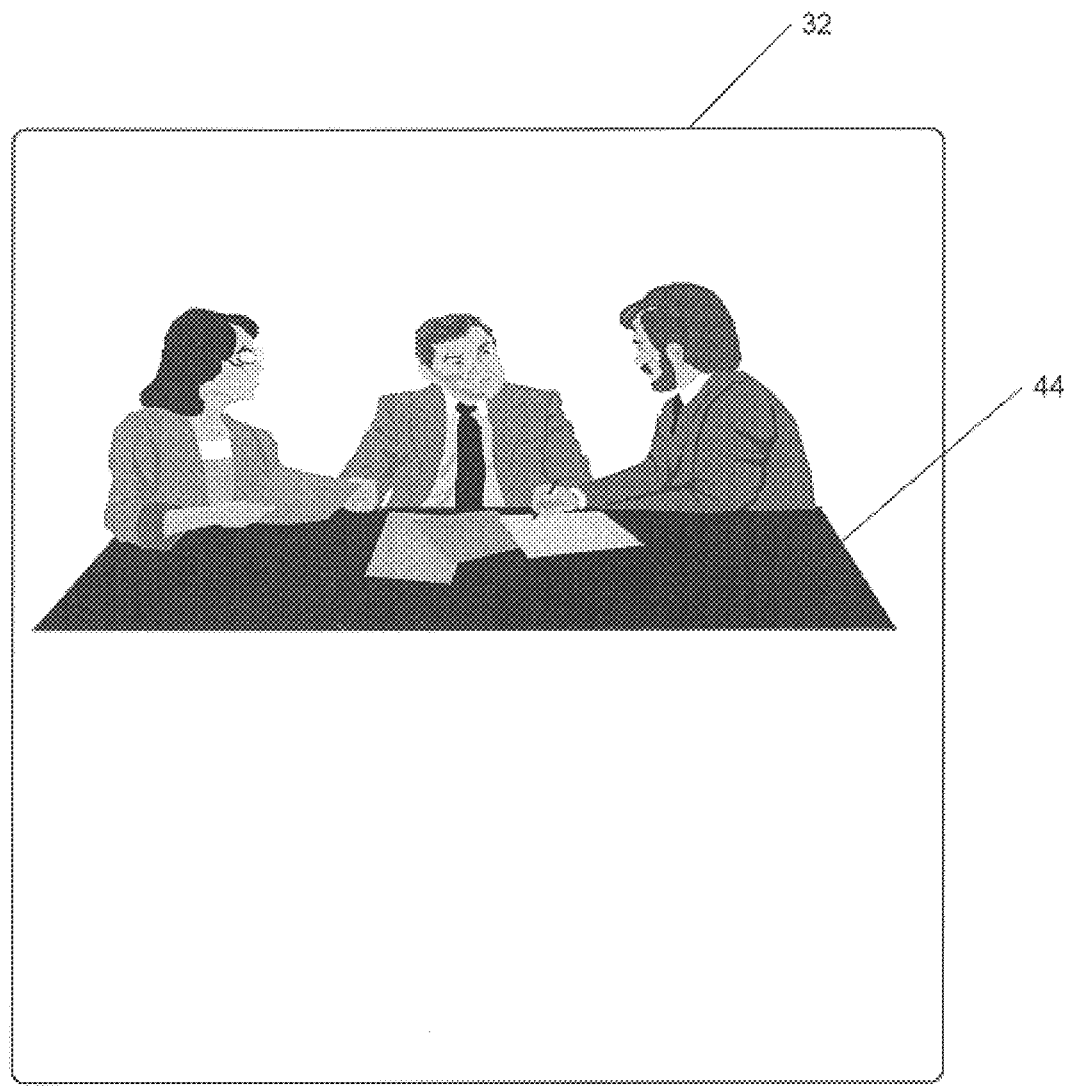

FIG. 2B illustrates one mode of the Conference View. As seen in FIG. 2B, display screen 32 is completely utilized by video information to provide video display 44. Furthermore, no icon representing the position of the pointing device 28 is provided. Thus, when entering Conference View, the setup screen is replaced by video information so as to provide a video display without computer generated feedback as to the position of the pointing device 28.

Despite the presentation of video information without an icon representing the pointing device, the information provided on display screen 32 may still be manipulated or controlled utilizing pointing device 28. Thus, if the pointing device 28 is moved, for example by rolling a trackball or sliding a mouse, the camera corresponding to the video information displayed may pan or tilt in response to the movement of the pointing device 28. If the pointing device 28 is moved side-to-side the camera will pan and if the pointing device 28 is moved forward and backward the camera will tilt. Combinations of side-to-side and forward or backward movement produces the corresponding pan and tilt of the camera.

Similarly, by depressing buttons on the pointing device 28, the camera may be zoomed in or zoomed out. For example, with a three button pointing device, the left button may cause the camera to zoom in while the button is depressed. Similarly, when the middle button of the pointing device is depressed, the camera may zoom out while the button is depressed. Thus, all aspects of camera movement which may be remotely controlled may be controlled directly in real time by the pointing device. As used herein, the term "real time" control refers to the operation of the camera directly by a single action of the pointing device. Thus, for example, the motion of the camera directly based on the motion of the pointing device without depressing a button or otherwise requiring further user input would be considered "real time" control.

By providing for real time pointing device movement based camera movement control, the present invention provides for control of the video information displayed by a video conferencing system without the inclusion of distracting pointing device icons or other computer generated feedback mechanisms. Such a control mechanism also allows for display of video only information which may increase system performance and reduce system complexity by reducing the circumstances where computer generated information and video information are combined in a single display screen. Furthermore, by eliminating the need for graphic user interface elements, the present invention may provide for increased size of the displayed video information (e.g. full screen video).

Figure 2C:
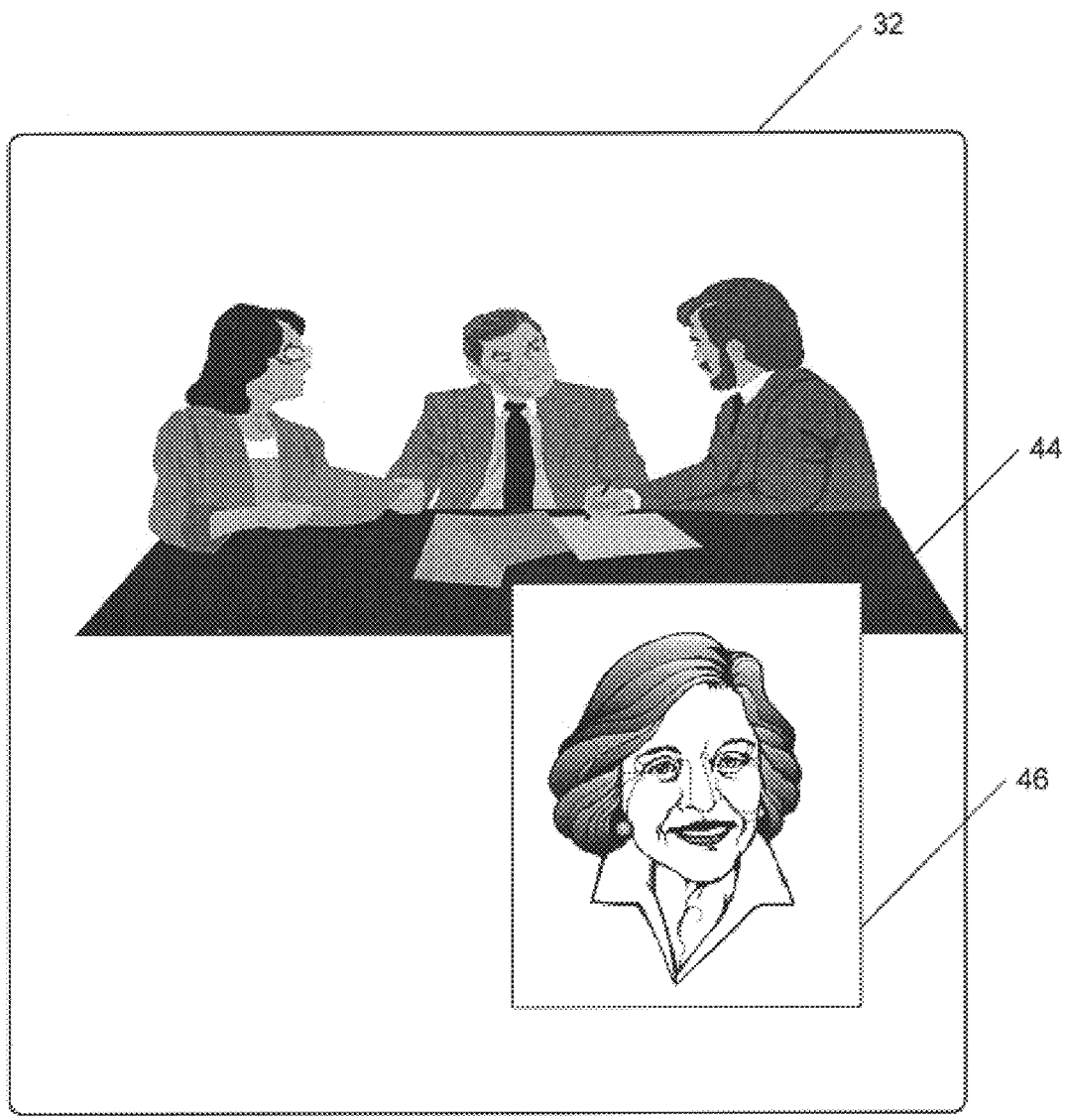
Figure 2D:
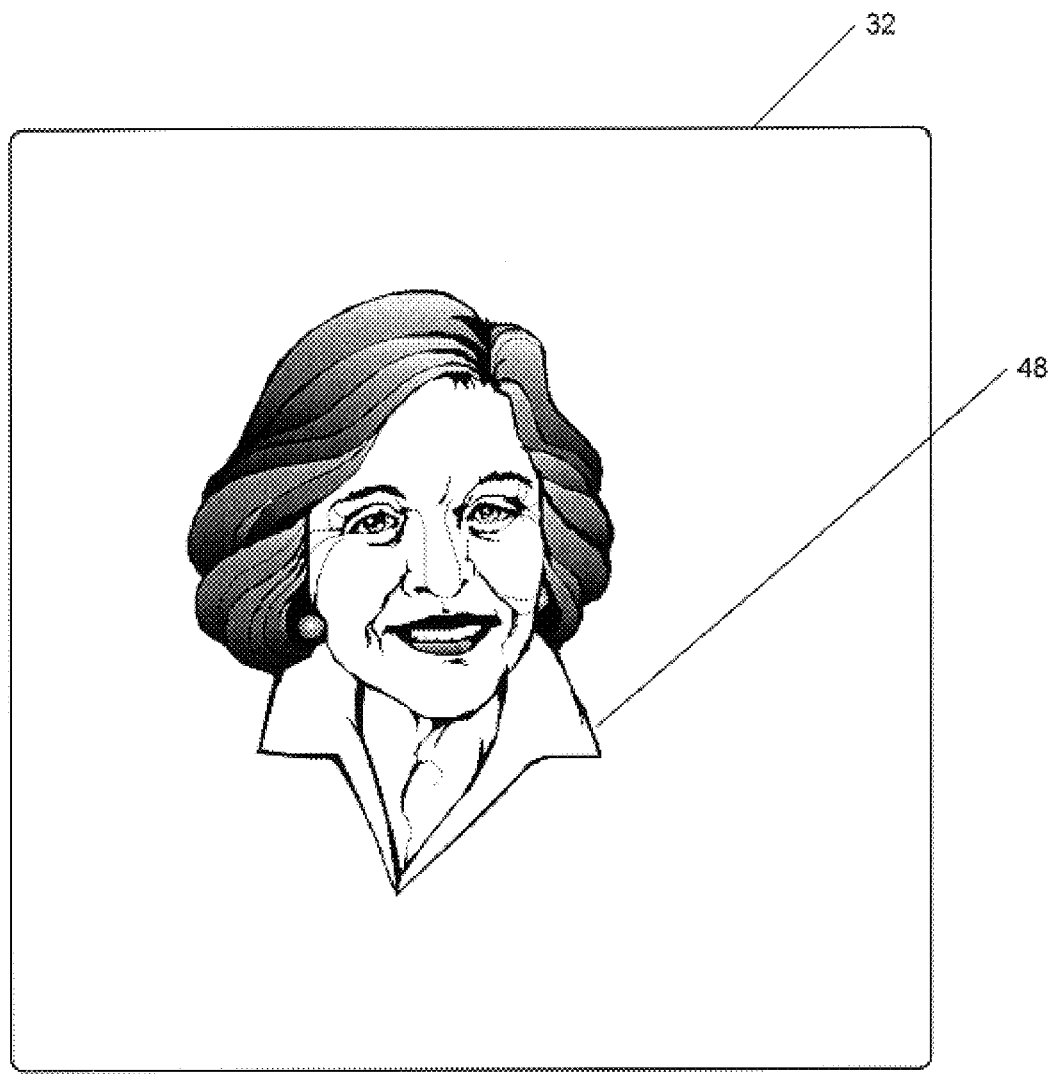

FIG. 2C illustrates another mode of the conference view which includes a picture-in-picture (PIP) window of video information from a secondary video source, such as a local camera or a camera at a third video conferencing station. As seen in FIG. 2C, the display screen 32 includes the original video information 44 of FIG. 2B and video information from another source in the PIP window 46. This PIP view may also be controlled by pointing device 28 without the need for the display of computer generated information. Similarly, FIG. 2D illustrates another conference view mode where the video information 48 from the PIP window 46 is displayed full screen on display screen 32.

Each of these alternative display modes may also be controlled by the pointing device without the need for the display of computer generated information associated with controlling the video information displayed. For example, by depressing a button on the pointing device 28, such as the right button in a three button device, the various video display modes may be cycled through in a rotating pattern. Thus, depressing the right button once may move from the display of FIG. 2B to the display of FIG. 2C. Depressing the button again may cause the display to change from FIG. 2C to the display of FIG. 2D. As will be appreciated by those of skill in the art, any number of alternative displays may be cycled through in a repeating pattern so as to provide the desired flexibility of the video conferencing system. Furthermore, by "double clicking" the right button, the setup display of FIG. 2A may be returned to at any time to allow for modification of the parameters of the video conference.

Operations for various aspects of one embodiment of the present invention are illustrated in detail in FIGS. 3 through 6 which are flowchart illustrations. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Figure 3:
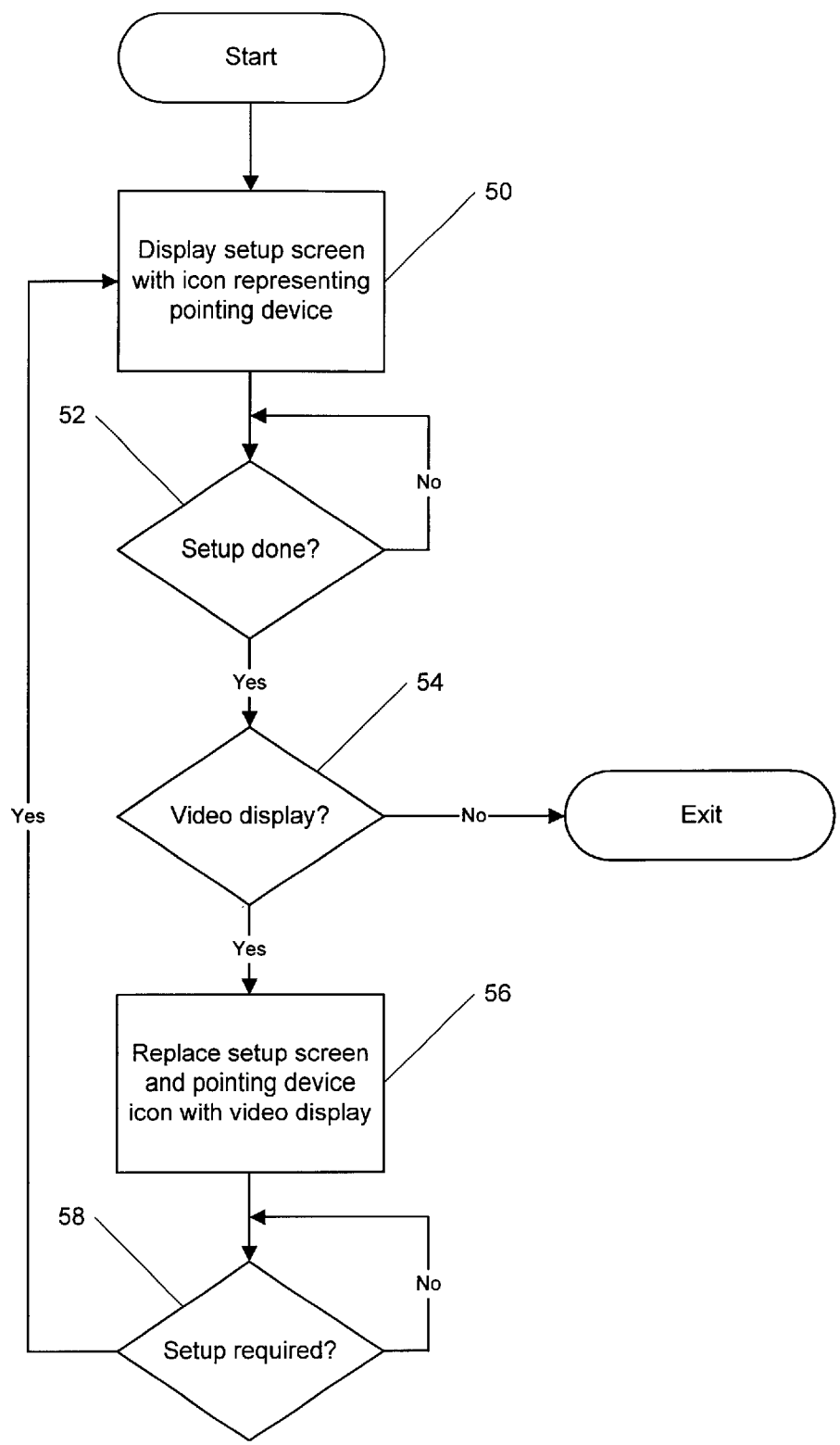
FIG. 3 is a flow chart illustrating operation of one embodiment of the present invention.

FIG. 3 illustrates the overall operation of a video conferencing system utilizing the present invention. As seen in FIG. 3, when the system is initially started, the setup screen is displayed which includes an icon representing the location of a pointing device to provide visual feedback of the location of the pointing device (block 50). During the setup the pointing device operates as a conventional pointing device in a graphic user interface. The setup screen may remain displayed until setup mode is exited (block 52). When setup is completed if there is no video information to display then the video conference system is not being utilized and the process ends (block 54).

However, if video information is available for display (block 54), then the setup screen, including the pointing device icon, is replaced with the video display (block 56). When the video information is displayed the operation of the pointing device is as described above with respect to FIGS. 2A through 2D and no icon or other computer generated image corresponding to the pointing device are displayed. If, however, further setup of the video conferencing system is required (block 58), then the setup screen is redisplayed (block 50) and operation o of the pointing device returns to conventional operation.

Figure 4:
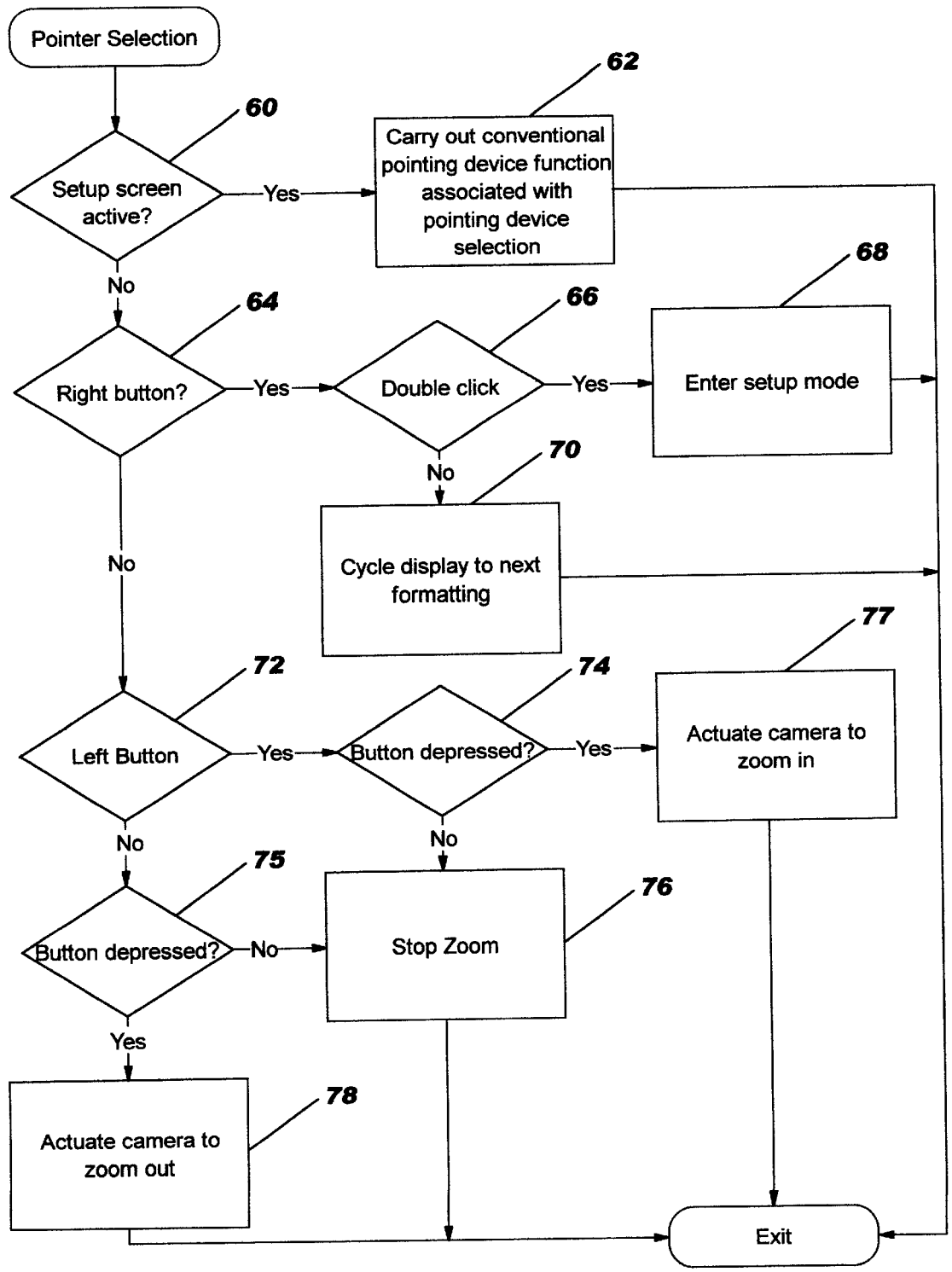
FIG. 4 is a flow chart illustrating operation of one embodiment of the present invention when a selection button is depressed on a pointing device.

The operation of the pointing device will now be described in more detail with reference to FIG. 4 through FIG. 6. As seen in FIG. 4, when a selection device of the pointing device is activated (e.g. a button depressed) if the setup screen is active (block 60), then a conventional pointer function of a graphic user interface is carried out (block 62). If, however, the setup screen is not active (block 64), then the video display is active. If the right button is depressed during the video display mode (block 64), then it is determined if the activation was a "double click" event (block 66).

If the event was a double click, then the video conferencing system enters setup mode (block 68) and the setup screen is redisplayed. If the event was not a double click event (block 66), then the video display is cycled to the next format in the rotation (block 70).

If the pointer device action was not a right button activation, then the video conferencing system determines if the left button event has occurred (block 72). If a left button event has occurred then the video conferencing system determines if it was a button depressed event (i.e. activation of the button) (block 74). If the left button was depressed then the camera is actuated to zoom in (block 77). If the action was a left button event (block 72) but was not a button depressed event (block 74) then the event was a left button release (i.e. de-activation of the left button) and the zoom of the camera is stopped.

Returning to block 72, if the button event was not a left button event, then the action was a center button event and the video conferencing system determines if it was a button depressed event (i.e. activation of the button) (block 75). If the center button was depressed then the camera is actuated to zoom out (block 78). If the action was not a left button event (block 72) but was not a button depressed event (block 75) then the event was a center button release (i.e. de-activation of the center button) and the zoom of the camera is stopped.

Figure 5:
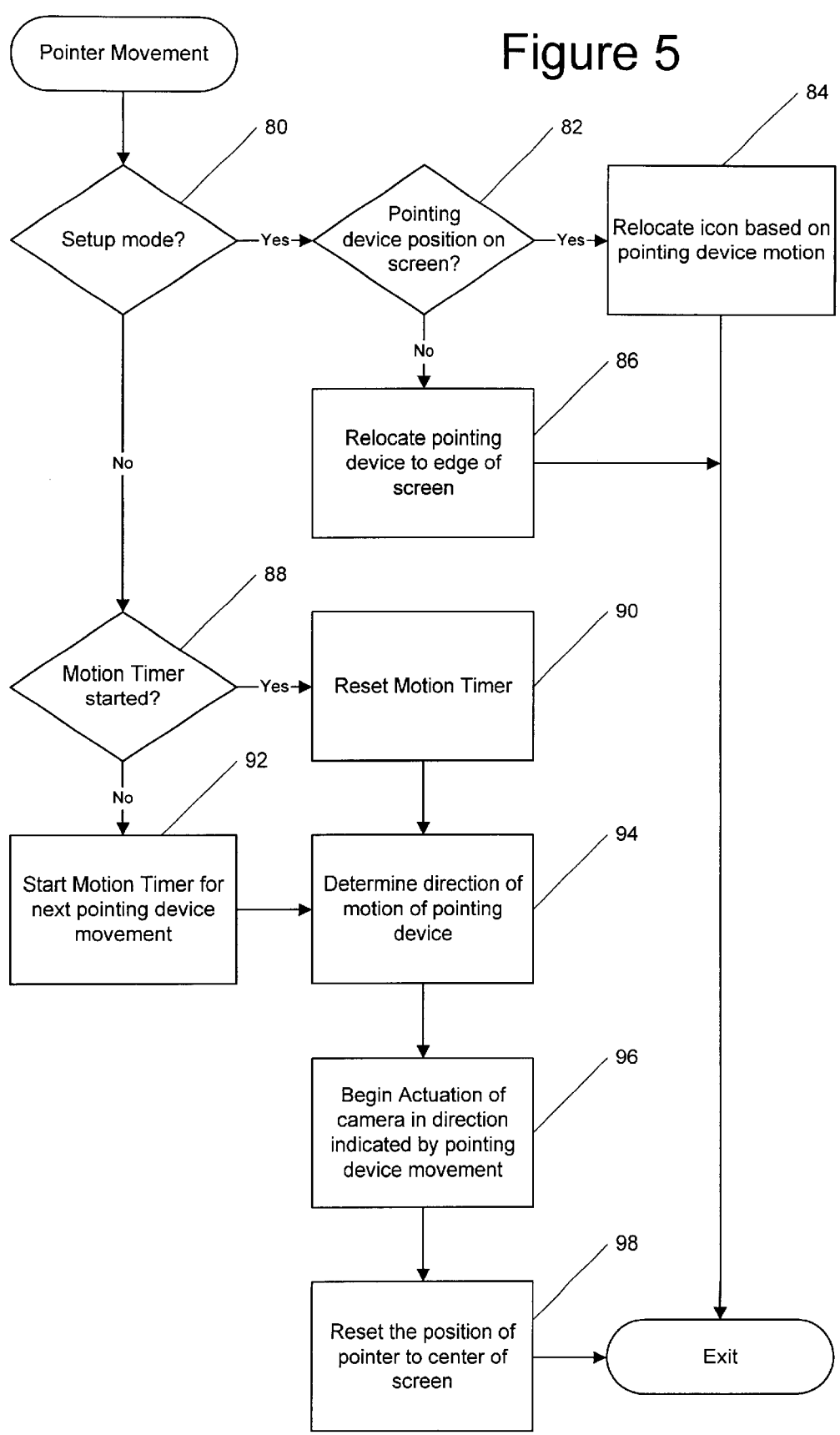
FIG. 5 is a flow chart illustrating operation of one embodiment of the present invention when movement of the pointing device is detected.
Figure 6:
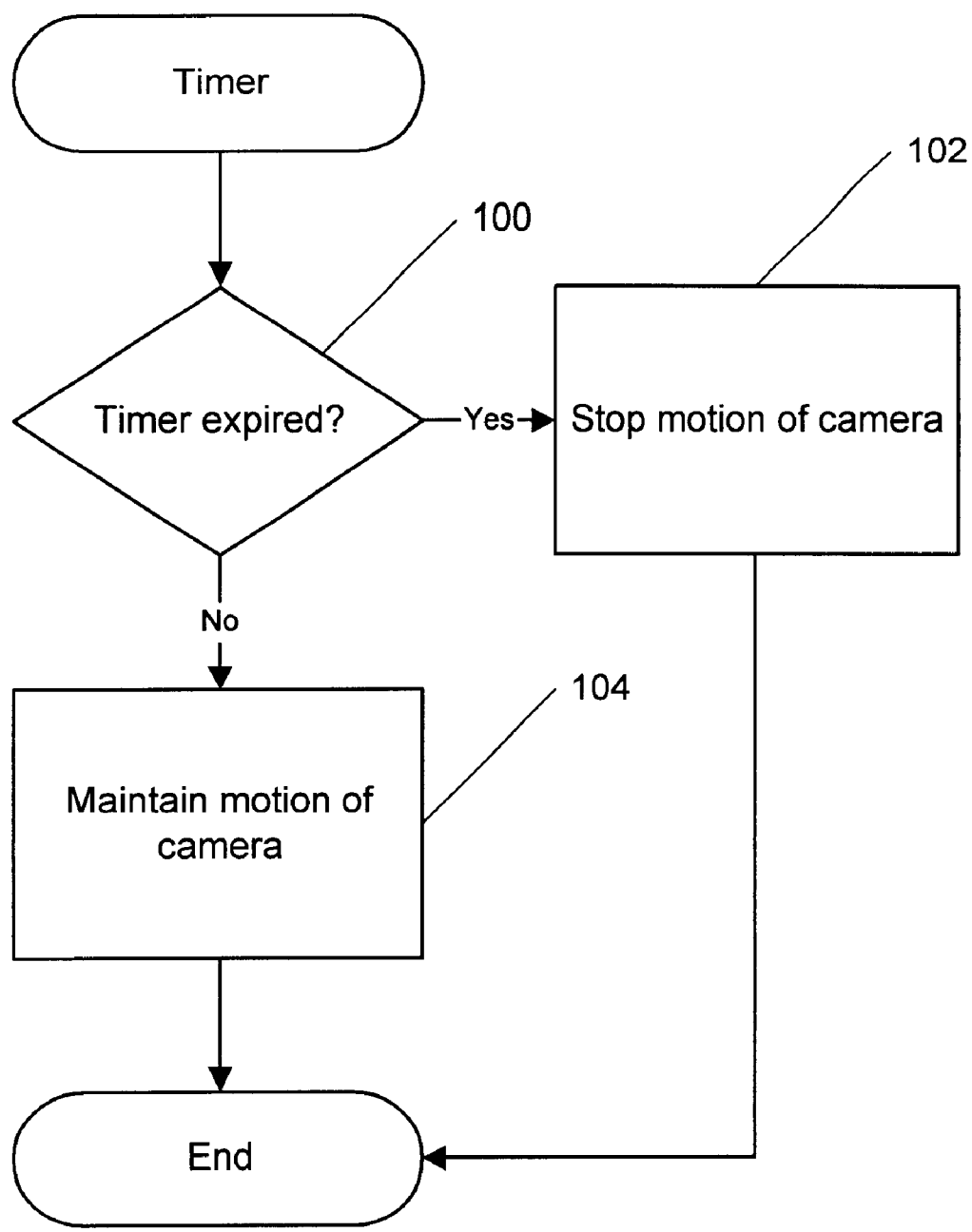
FIG. 6 is a flow chart illustrating operation of one embodiment of the present invention for terminating camera movement initiated by movement of the pointing device.

The operation of a video conferencing system according to the present invention as a result of movement of the pointing device 28 are illustrated in FIG. 5. As seen in FIG. 5, when a pointing device movement event occurs, the video conferencing system determines if the setup screen is active (block 80). If the setup screen is active, then it is determined if the position of the pointing device corresponds to a position on the screen (block 82). If the pointing device is on the screen then the icon representing the pointing device location is moved to the pointing device location based on the movement of the pointing device (block 84). If the location of the pointing device is not on the screen, then the icon representing the position of the pointing device is relocated to the edge of the screen corresponding to the nearest point to the location of the pointing device and the position of the pointing device is set to this location (block 86).

If the setup screen is not active (block 80), then a timer associated with the movement is either started (block 92) of reset (block 90) depending on whether a timer had been previously started (block 88). After this initialization of the timer, the video conferencing system determines the direction of motion of the pointing device (block 94). The camera is then actuated to move in the direction indicated by the pointing device movement (block 96). The position of the pointing device is then reset to the center of the screen (block 98). The resetting of the position of the pointing device prevents a user from positioning the pointing device off screen which may limit the range of motion for a pointing device in some operating systems.

As has been discussed above with respect to pointing device motion, a timer is started based on the event. The operations associated with the motion timer are illustrated in FIG. 6. As seen in FIG. 6, if the timer has not expired (block 100) the action of the camera is maintained (block 104). This corresponds to maintaining the motion of the camera for a finite period of time based on any pointing device input. Once the timer expires (block 100) the action of the camera is stopped (block 102). A timer duration of less than about 100 milliseconds may be used for many operations, however, the timer duration may be programmable and values of from about 5 milliseconds to about 500 milliseconds may be suitable. Actual timer values may also depend on whether pointing device input is queued and the rate at which pointing device input is available. The use of timer tends to smooth the operation of the camera in response to input from the pointing device.

While the present invention has been described with respect to particular pointing device actions, as will be appreciated by those of skill in the art, other actions resulting from pointing device actions may be utilized while still benefitting from the teachings of the present invention.

Furthermore, while the present invention has been described with respect to the use of a timer associated with pointing device motion, such a timer may be unnecessary in a system where pointing device motion may be directly captured such as the DirectInput feature of Microsoft's DirectX programming interface for Windows95®. In such a case the starting and stopping of motion of the pointing device may be directly captured by application programs, thus avoiding the need for a timer to determine if motion of the pointing device has been stopped.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of controlling operations of a video conferencing system, the method comprising the steps of:
   controlling in real time the operation of a camera which provides video to be displayed through input to a pointing device so as to provide direct control of the motion of the camera through movement of the pointing device, wherein said step of controlling comprises the steps of:
      receiving input from the pointing device corresponding to movement of the pointing device to provide movement data;
      actuating the camera associated with the video conferencing system in a direction indicated by the movement data;
      initiating a timer upon receipt of the movement data; and
      stopping motion of the camera if the timer expires without receiving subsequent movement data.

2. A method according to claim 1, further comprising the step of controlling the operation of a graphic user interface by displaying an icon corresponding to the position of a pointing device with respect to the graphic user interface so as to provide computer generated visual feedback as to the screen location corresponding to the location of the pointing device during setup of the video conferencing system.

3. A method according to claim 1 wherein said step of controlling comprises zooming the field of view of the camera in response to user input from the pointing device.

4. A method according to claim 3, wherein said step of zooming comprises the steps of:
   receiving input from the pointing device corresponding to activation of a first selection device of the pointing device;
   actuating a camera associated with the video conferencing system so as to zoom the camera in a first direction in response to the received input corresponding to the activation of the first selection device;
   receiving input from the pointing device corresponding to de-activation of the first selection device of the pointing device; and
   stopping the zoom of the camera in response to the received input corresponding to the de-activation of the first selection device.

5. A method according to claim 1, further comprising the step of controlling the source of the video information displayed based upon input from the pointing device.

6. A method according to claim 5, wherein said step of controlling the source of video information comprises the step of selecting for display a source of video information from a plurality of video information sources based upon input from the pointing device.

7. A method according to claim 1, further comprising the step of controlling the arrangement of the display of video information from multiple video information sources.

8. A system for controlling operations of a video conferencing systems comprising:
   a camera capable of remote control operation; and
   means for controlling in real time the operation of the camera which provides video to be displayed through input to a pointing device so as to provide direct control of the motion of the camera through movement of the pointing device, wherein said means for controlling comprise:
      means for receiving input from the pointing device corresponding to movement of the pointing device to provide movement data;
      means for actuating the camera associated with the video conferencing system in a direction indicated by the movement data;
      means for initiating a timer upon receipt of the movement data; and
      means for stopping motion of the camera if the timer expires without receiving subsequent movement data.

9. A system according to claim 8, further comprising means for controlling the operation of a graphic user interface by displaying an icon corresponding to the position of a pointing device with respect to the graphic user interface so as to provide computer generated visual feedback as to the screen location corresponding to the location of the pointing device during setup of the video conferencing system.

10. A system according to claim 8 wherein said means for controlling further comprises means for zooming the field of view of the camera in response to user input from the pointing device.

11. A system according to claim 10, wherein said means for zooming comprises:
   means for receiving input from the pointing device corresponding to activation of a first selection device of the pointing device;
   means for actuating the camera so as to zoom the camera in a first direction in response to the received input corresponding to the activation of the first selection device;
   means for receiving input from the pointing device corresponding to de-activation of the first selection device of the pointing device; and
   means for stopping the zoom of the camera in response to the received input corresponding to the de-activation of the first selection device.

12. A system according to claim 8, further comprising means for controlling the source of the video information displayed based upon input from the pointing device.

13. A system according to claim 12, wherein said means for controlling the source of video information comprises means for selecting for display a source of video information from a plurality of video information sources based upon input from the pointing device.

14. A system according to claim 8, further comprising means for controlling the arrangement of the display of video information from multiple video information sources.

15. A computer program product for controlling operations of a video conferencing system, the computer program product comprising:

a computer-readable storage medium having computer-readable program code means embodied in said medium, said computer-readable program code means comprising:

computer-readable program code means for controlling in real time the operation of a camera which provides video to be displayed through input to a pointing device so as to provide direct control of the motion of the camera through movement of the pointing device, wherein said computer readable code means for controlling comprise:

computer readable code means for receiving input from the pointing device corresponding to movement of the pointing device to provide movement data;

computer readable code means for actuating the camera associated with the video conferencing system in a direction indicated by the movement data;

computer readable code means for initiating a timer upon receipt of the movement data; and computer readable code means for stopping motion of the camera if the timer expires without receiving subsequent movement data.

16. A computer program product according to claim 15, further comprising computer readable program code means for controlling the operation of a graphic user interface by displaying an icon corresponding to the position of a pointing device with respect to the graphic user interface so as to provide computer generated visual feedback as to the screen location corresponding to the location of the pointing device during setup of the video conferencing system.

17. A computer program product according to claim 15 wherein said computer readable program code means for controlling further comprises computer readable program code means for zooming the field of view of the camera in response to user input from the pointing device.

18. A computer program product according to claim 17, wherein said computer readable program code means for zooming comprises:

computer readable program code means for receiving input from the pointing device corresponding to activation of a first selection device of the pointing device;

computer readable program code means for actuating a camera so as to zoom the camera in a first direction in response to the received input corresponding to the activation of the first selection device;

computer readable program code means for receiving input from the pointing device corresponding to de-activation of the first selection device of the pointing device; and computer readable program code means for stopping the zoom of the camera in response to the received input corresponding to the de-activation of the first selection device.

19. A computer program according to claim 15, further comprising computer readable program code means for controlling the source of the video information displayed based upon input from the pointing device.

20. A computer program product according to claim 15, wherein said computer readable program code means for controlling the source of video information comprises computer readable program code means for selecting for display a source of video information from a plurality of video information sources based upon input from the pointing device.

21. A computer program product according to claim 15, further comprising computer readable program code means for controlling the arrangement of the display of video information from multiple video information sources.

* * * * *